May 4, 1943.  J. C. CROWLEY  2,318,376
AIR BAG STEM
Filed March 29, 1941
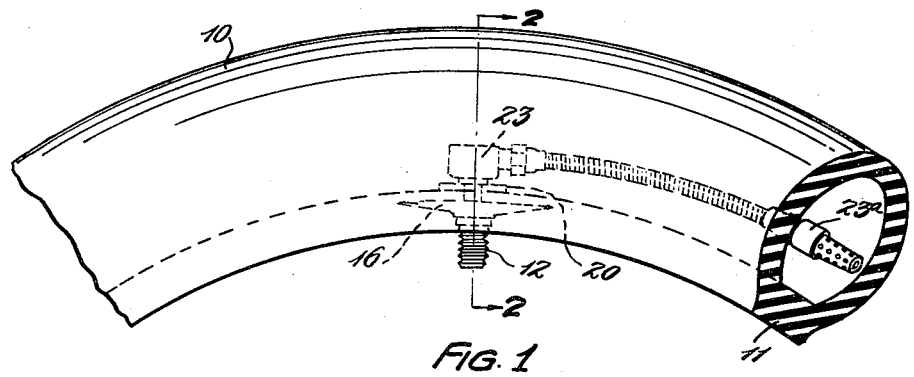
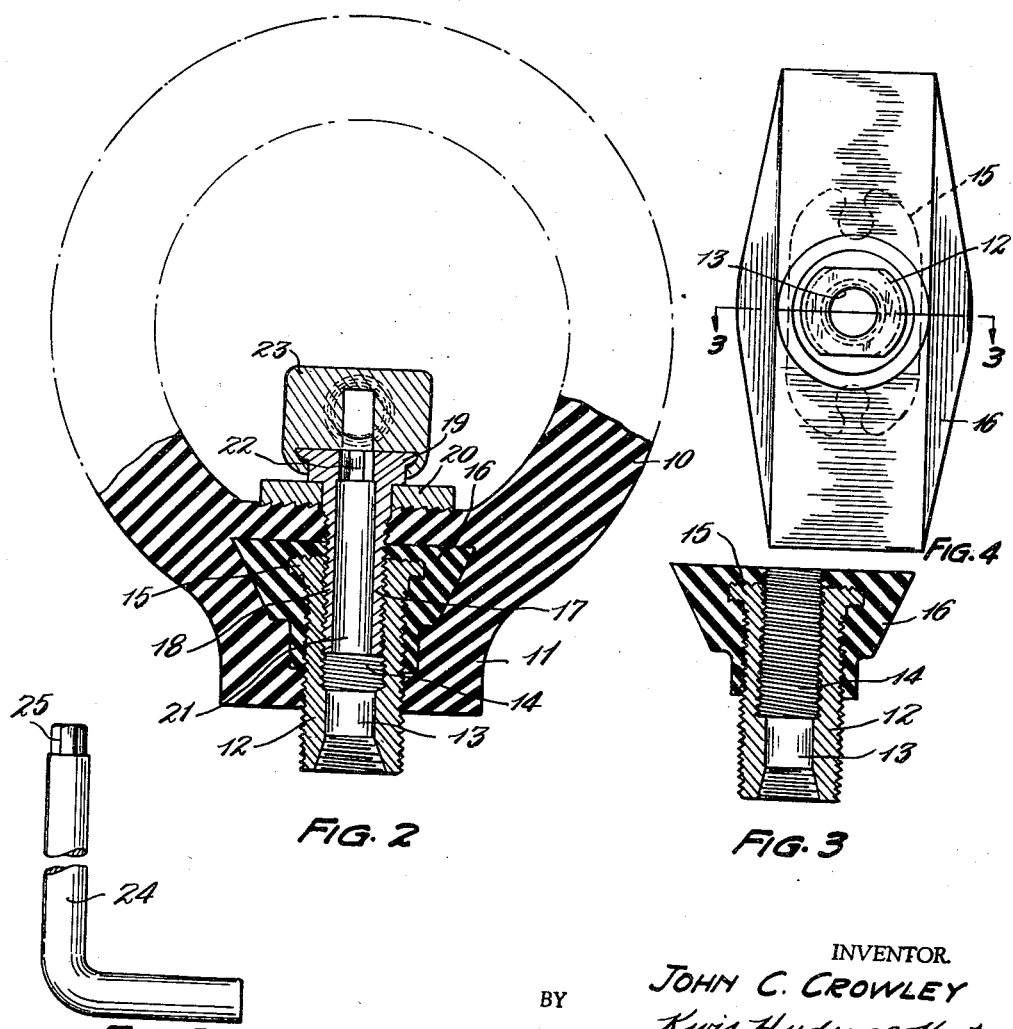
INVENTOR.
JOHN C. CROWLEY
BY Kwis Hudson & Kent
ATTORNEYS Patented May 4, 1943

2,318,376

UNITED STATES PATENT OFFICE 2,318,376

AIR BAG STEM

John C. Crowley, Cleveland Heights, Ohio, assignor to The Dill Manufacturing Company, Cleveland, Ohio, a corporation of Ohio Application March 29, 1941, Serial No. 385,896

3 Claims. (Cl. 18—45)

This invention relates to a stem for an air bag such as is used in the manufacture of pneumatic tire casings.

In manufacturing pneumatic tire casings and other similar rubber articles air bags of the type disclosed herein are positioned within the tire casings during the curing of the same and then the air bags are inflated with steam or other fluid to provide vulcanizing heat. These air bags are usually constructed of rubber and are provided with metal stems vulcanized in the material of the bags and through which stems the steam or other fluid is introduced into the bags. Consequently the air bag stems are subjected to a high degree of heat which tends to break or destroy the rubber-to-metal bond or adhesion between the bag material and the air bag stem, with the result leaks frequently occur between the air bag stem and the air bag with a possible destruction of the useful life of the air bag.

An object of the present invention is to provide in combination with an air bag a metal stem for the same which is so constructed and is so connected to the bag as to greatly lessen the likelihood of leaks occurring between the air bag and the stem.

Another object is to provide in connection with an air bag and its stem, means for effecting a tight seal between the stem and air bag, notwithstanding the deterioration of the rubber of the bag because of the heat to which it is subjected and the breaking of the rubber to metal bond between the bag and its stem.

A still further object is to provide in connection with an air bag and its stem, means operable from the outer end of the stem for effecting a mechanical clamping seal between the stem and the air bag as the rubber of the bag and the bond between the bag and the stem deteriorates because of the heat to which such elements are subjected.

Summarily expressed, the main object of the invention is to provide a stem construction which is secured to an air bag in such manner as to increase the useful life of the air bag.

Further and additional objects and advantages not hereinbefore specified will become apparent during the following detailed description of an embodiment of the invention which is illustrated in the accompanying drawing wherein, Fig. 1 is a fragmentary elevational view of an air bag of the type referred to.

Fig. 2 is a transverse partial sectional view through the air bag and stem and is taken substantially on line 2—2 of Fig. 1 looking in the direction of the arrows.

Fig. 3 is a detail sectional view of one of the elements constituting the air bag stem and is taken substantially on line 3—3 of Fig. 4, looking in the direction of the arrows.

Fig. 4 is a top plan view of the stem element shown in Fig. 3, and

Fig. 5 is a detail elevational view of a tool which can be employed to tighten the mechanical seal between the air bag and stem from time to time if the metal-to-rubber bond between the same deteriorates and tends to break.

The air bag 10 may be of usual construction and as is customary is formed of rubber. The air bag on its inner circumference is provided with a thickened annular rib 11. The stem element shown in detail in Figs. 3 and 4 comprises a metal stem portion 12 that has a relatively large bore therethrough consisting of an outer smooth part 13 and an inner slightly larger and threaded part 14. The inner end of the metal stem portion 12 is provided with a flange or head 15 elongated in the direction of the annular air bag. The metal stem portion 12 has its inner end embedded in and vulcanized to a piece of rubber 16, as clearly indicated in Figs. 2, 3 and 4. The metal stem portion 12 and the piece of rubber 16 are positioned in the material of the air bag with the outer end of the stem portion 12 projecting radially through and beyond the rib 11, while the piece of rubber 16 that is vulcanized to the stem portion 12 is molded into the material forming the wall of the air bag, wherefore said piece of rubber is located adjacent to the interior of the air bag and is consequently subjected to the heat of the steam or other fluid in the air bag. In some constructions the piece of rubber 16 may be omitted and the metal stem molded directly into the air bag wall.

The second stem element comprises a metal stud member 17 which has an externally threaded portion 18 of such size as to screw into the threaded part 14 of the bore through the stem portion 12. The stud member 17 at its inner end and within the air bag 10 is provided with an enlarged flange 19. This flange 19 may be of such size and shape as to directly engage with the inner surface of the air bag but, by way of illustration, a clamping washer 20 is shown as interposed between the flange 19 and the inner surface of the air bag. The stud member 17 is provided with a relatively large diameter straight bore 21 extending therethrough into the flange 19. The bore 21 at its inner end in the flange 19 includes a portion of polygonal cross section, as indicated at 22, and said portion constitutes a wrench socket. The flange 19 has swivelled thereto a fitting 23 which is provided with a passage communicating with the bore 21 and with what is commonly called in the art, a "pigtail" 23a that is secured to the fitting. The "pigtail" 23a is formed of flexible tubing weighted on its free end so as to lie in the lowest portion of the air bag to enable all condensation to be evacuated from the interior of the air bag.

It will be seen that when the first element comprising the metal stem portion 12 is mounted in the air bag and the second element of the stem, namely, the stud 17 and washer 20 are assembled as shown in Fig. 2, then a suitable wrench such as the wrench 24 can be inserted through the member 12 and the stud 17 to engage the polygonal end 25 of the wrench with the polygonally shaped portion or socket 22 of the bore 21 in the stud member 17. Rotation of the wrench 24 when thus arranged rotates the stud member 17 relative to the metal stem portion 12 and causes said stud member to screw into the threaded part 14 of the bore through the metal stem member 12, with the result that the flange 19 presses the washer 20 into tight clamping engagement with the inner surface of the air bag. Accordingly it will be seen that the material of the air bag which is interposed between the clamping washer 20 and the base of its stem portion 12 is firmly clamped between said washer and said base, thus affording a tight mechanical seal, wherefore pressure fluid will not leak from the air bag between the stem and the air bag.

In order for any pressure fluid to leak as thus specified, it must follow the elongated path defined by the contacting surface of the washer 20 and the material of the bag, after which it must pass either around the piece of rubber 16 or between said piece of rubber and the stud 17 and metal stem portion 12.

It will be remembered that the piece of rubber 16 is vulcanized to the metal stem portion 12 and that said piece of rubber and the bonding surface between it and the metal stem part 12 are separated with respect to the inner surface of the air bag by the air bag material.

The present construction is such that from time to time should any leak occur between the air bag and its stem the mechanical seal between the stem and air bag can be tightened from the outer end of the stem merely by inserting a suitable wrench, such as the wrench 24, into the stem and turning the same in the proper direction. Consequently the effective life of the air bag will be greatly increased, it being remembered that heretofore when leaks occurred between the air bag and its stem because of deterioration in the bond therebetween or for some other reason, the useful life of the air bag was considerably lessened.

It will be understood that pressure fluid such as steam can be introduced into the air bag through the stem by a suitable conduit connected to the stem and to a source of supply, as is well known in the art.

Although a preferred embodiment of the invention has been illustrated and described herein it will be understood that the invention is susceptible of various modifications and adaptations within the scope of the appended claims.

Having thus described my invention, I claim:

1. In combination, an air bag and a stem therefor, said stem comprising an outer portion provided with a bore therethrough having its inner end threaded, said portion being embedded in and connected with the material forming the air bag by vulcanization, an inner stem portion externally threaded and screwing into the threaded part of the bore through the outer stem portion and extending into the interior of the air bag and provided with a bore therethrough in communication with said interior, and means carried by the inner end of said inner stem portion for clamping the air bag material between said means and said outer stem portion when said inner stem portion is screwed into the latter, said means including an enlarged head on the inner end of said inner stem portion, said head having at its inner end a radially extending flange.

2. An air bag stem comprising an outer portion adapted to be secured in the material of the air bag and provided with a bore therethrough having its inner end threaded, an inner stem portion externally threaded and screwing into the threaded part of the bore through the outer stem portion and extending beyond the inner end of said latter portion, and means carried by the inner end of said inner stem portion adapted to cooperate with the outer portion to clamp the material of the air bag therebetween when said inner portion is screwed into the outer portion, said means including an enlarged head on the inner end of said inner stem portion and provided with plain end surfaces, said head being radially enlarged at its inner end with respect to the remainder of the head to provide a connecting flange for a fitting adapted to be swivelly connected to said head.

3. An air bag stem comprising an outer portion adapted to be secured in the material of the air bag and provided with a bore therethrough having its inner end threaded, an inner stem portion externally threaded and screwing into the threaded part of the bore through the outer stem portion and extending beyond the inner end of the latter, means carried by the inner end of said inner stem portion adapted to cooperate with the outer stem portion when said inner portion is screwed into the latter to clamp the material of the air bag therebetween, said means including an enlarged head on the inner end of said inner stem portion, said head having at its inner end a radially extending flange, and a fitting mounted on the inner end of said head and provided with an inturned annular connecting flange embracing said radially extending flange.

JOHN C. CROWLEY.